United States Patent
Ishikawa et al.

(10) Patent No.: US 7,688,353 B2
(45) Date of Patent: Mar. 30, 2010

(54) IMAGE-TAKING APPARATUS AND IMAGE-TAKING METHOD

(75) Inventors: Masanori Ishikawa, Saitama (JP); Tohru Kawai, Kawasaki (JP); Jun Sugita, Sagamihara (JP); Mitsuru Shinohara, Hokuto (JP); Isamu Go, Utsunomiya (JP); Yuki Nagao, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 1239 days.

(21) Appl. No.: 11/198,808

(22) Filed: Aug. 5, 2005

(65) Prior Publication Data

US 2006/0033817 A1 Feb. 16, 2006

(30) Foreign Application Priority Data

Aug. 6, 2004 (JP) .............................. 2004-231574

(51) Int. Cl.
*H04N 5/232* (2006.01)
(52) U.S. Cl. .............................. 348/208.5; 348/208.99; 348/231; 348/222
(58) Field of Classification Search ............... 348/208.5
See application file for complete search history.

(56) References Cited

U.S. PATENT DOCUMENTS

| | | | |
|---|---|---|---|
| 5,452,047 A * | 9/1995 | Fujii et al. ................... 396/133 |
| 5,867,213 A * | 2/1999 | Ouchi ..................... 348/208.5 |
| 5,982,421 A * | 11/1999 | Inou et al. ................ 348/208.5 |
| 6,035,134 A * | 3/2000 | Sato et al. ..................... 396/55 |
| 6,081,668 A * | 6/2000 | Furuyama et al. ............. 396/55 |
| 6,510,283 B1 * | 1/2003 | Yamagishi .................... 396/55 |
| 6,694,096 B1 * | 2/2004 | Imada .......................... 396/52 |
| 6,900,831 B2 * | 5/2005 | Nishiwaki ................ 348/208.5 |
| 2005/0179784 A1 * | 8/2005 | Qi ........................... 348/208.1 |

FOREIGN PATENT DOCUMENTS

| | | |
|---|---|---|
| JP | 3110797 | 5/1991 |
| JP | 11-101998 | 4/1999 |
| JP | 11-146260 | 5/1999 |
| JP | 2002-027312 | 1/2002 |
| JP | 2004-221992 | 8/2004 |

\* cited by examiner

*Primary Examiner*—Lin Ye
*Assistant Examiner*—Temitope Adeyiga
(74) *Attorney, Agent, or Firm*—Rossi, Kimms & McDowell LLP

(57) ABSTRACT

An image-taking apparatus is disclosed which allows a selection of a type of image stabilization to be used from optical image stabilization and electronic image stabilization as required to provide an excellent output image. The image-taking apparatus has an image generator which is operable in a first mode in which it performs electronic image stabilization processing based on a plurality of images sequentially taken with an image-pickup device to generate an output image and a second mode in which it generates an output image without performing the electronic image stabilization processing on an image taken with the image-pickup device. The image-taking apparatus also has a controller which causes image stabilization operation to be performed through driving of an optical system in both of the first and second modes and selects one of the first mode and the second mode.

4 Claims, 4 Drawing Sheets

IMAGE-TAKING APPARATUS AND IMAGE-TAKING METHOD

BACKGROUND OF THE INVENTION

The present invention relates to an image-taking apparatus which achieves improved accuracy in taking an image through image shake correction.

In recent years, automation of all the operations in taking images such as exposure determination and focusing has reduced the probability of failing to take good images even when a camera user has only a little knowledge about the camera. In addition, an image shake correction function allows a user to take better images. An image stabilization system for preventing image shake will be described below.

A camera typically shakes at a wavelength between 1 Hz and 10 Hz in taking images. A basic idea for suppressing the shake at the time of exposure to take an image without blurring is to detect the shake of the camera from image shake and displace a correction lens in a plane orthogonal to an optical axis in response to the detection result. In other words, to take an image without blurring even when the camera shakes, it is necessary to accurately detect the shake of the camera in the first place, and to correct the change of the optical axis due to the image shake in the second place.

The image shake correction described above can be performed in principle such that a laser gyro or the like detects the acceleration, angular acceleration, angular velocity, angular displacement and the like, and a shake detector is provided for the camera to perform calculations of the detection result as appropriate.

A correction optical apparatus is driven to move the optical axis for image-taking based on the information about the camera shake detection output from the shake detector. Image shake correction is achieved in this manner.

Another method has been proposed in which image-taking is repeated a plurality of number of times with an exposure time set to involve no image shake, and the images provided through these image-taking operations are combined while their displacements are corrected, thereby providing the taken image (the combined image) with a long exposure time (Japanese Patent No. 3110797).

When the image-taking magnification is smaller than 0.1, any shake can generally be corrected by optical image shake correction (optical image stabilization) through angular shake correction. However, when the image-taking magnification is larger than 0.1, shift shake has a larger influence. If the image-taking magnification is even larger, shake in a focus direction has a lager influence. Thus, the effect of image shake correction cannot be provided sufficiently when the optical image stabilization is employed in a device with a high image-taking magnification such as a macro lens.

On the other hand, when moving images are taken by a video camera, electronic image stabilization has been proposed in which motion vectors in an image are detected by an image-pickup device and the read position in the image is changed to match the motion vectors to provide moving images without shake.

In the electronic image stabilization, however, the motion vectors are detected in the video camera by taking a plurality of images out in one second and comparing the respective taken images. When a digital camera is used to take a still image with only one exposure for a taken subject, it is not possible to detect motion vectors by comparing images in frames. As a result, the image stabilization system for the video camera cannot be applied to the digital camera.

Japanese Patent No. 3110797 has disclosed the electronic image stabilization technique in which image-taking is repeated a plurality of number of times and the images provided through these image-taking operations are combined while their displacements are corrected, thus providing a taken image. However, the image-taking repeated a plurality of number of times causes a long image-taking time, and the sufficient effect of correction cannot be provided due to a subject movement or the like.

In addition, in the technique disclosed in Japanese Patent No. 3110797, a user should determine whether or not he/she needs to take action for image stabilization. However, it is difficult for the user to determine whether or not the action for image stabilization is required at the site of image-taking, which makes the technique less convenient for the user.

BRIEF SUMMARY OF THE INVENTION

It is an object of the present invention to provide an image-taking apparatus and an image-taking method which allow a selection of a type of image stabilization to be used from optical image stabilization and electronic image stabilization as required to provide an excellent output image and provide improved usability for a user.

According to one aspect, the present invention provides an image-taking apparatus which has an image generator which is operable in a first mode in which it performs electronic image stabilization processing based on a plurality of images sequentially taken an the image-pickup device to generate an output image and a second mode in which it generates an output image without performing the electronic image stabilization processing on an image taken with the image-pickup device, and a controller which causes image stabilization operation to be performed through driving of an optical system in both of the first and second modes and selects one of the first mode and the second mode.

According to another aspect, the present invention provides an image-taking apparatus which has an image generator which performs electronic image stabilization processing based on a plurality of images sequentially taken with an image-pickup device to generate an output image, and a controller which changes an exposure time of each of the images taken in the image generator depending on an image-taking magnification.

According to yet another aspect, the present invention provides a method of taking an image which has a first step of performing electronic image stabilization processing based on a plurality of images sequentially taken with an image-pickup device to generate an output image, a second step of generating an output image without performing the electronic image stabilization processing on an image taken with the image-pickup device, a step of performing image stabilization operation through driving of an optical system in both of the first and second steps, and a step of selecting one of the first and second steps.

According to a further aspect, the present invention provides a method of taking an image which has the steps of performing electronic image stabilization processing based on a plurality of images sequentially taken with an image-pickup device to generate an output image, and changing an exposure time of each of the taken images depending on an image-taking magnification.

Other objects and features of the present invention will become readily apparent from the following description of the preferred embodiments with reference to accompanying drawings.

DETAILED DESCRIPTION OF THE PREFERRED EMBODIMENTS

A preferred embodiment of the present invention will hereinafter be described with reference to the drawings.

Embodiment 1

Figure 1:
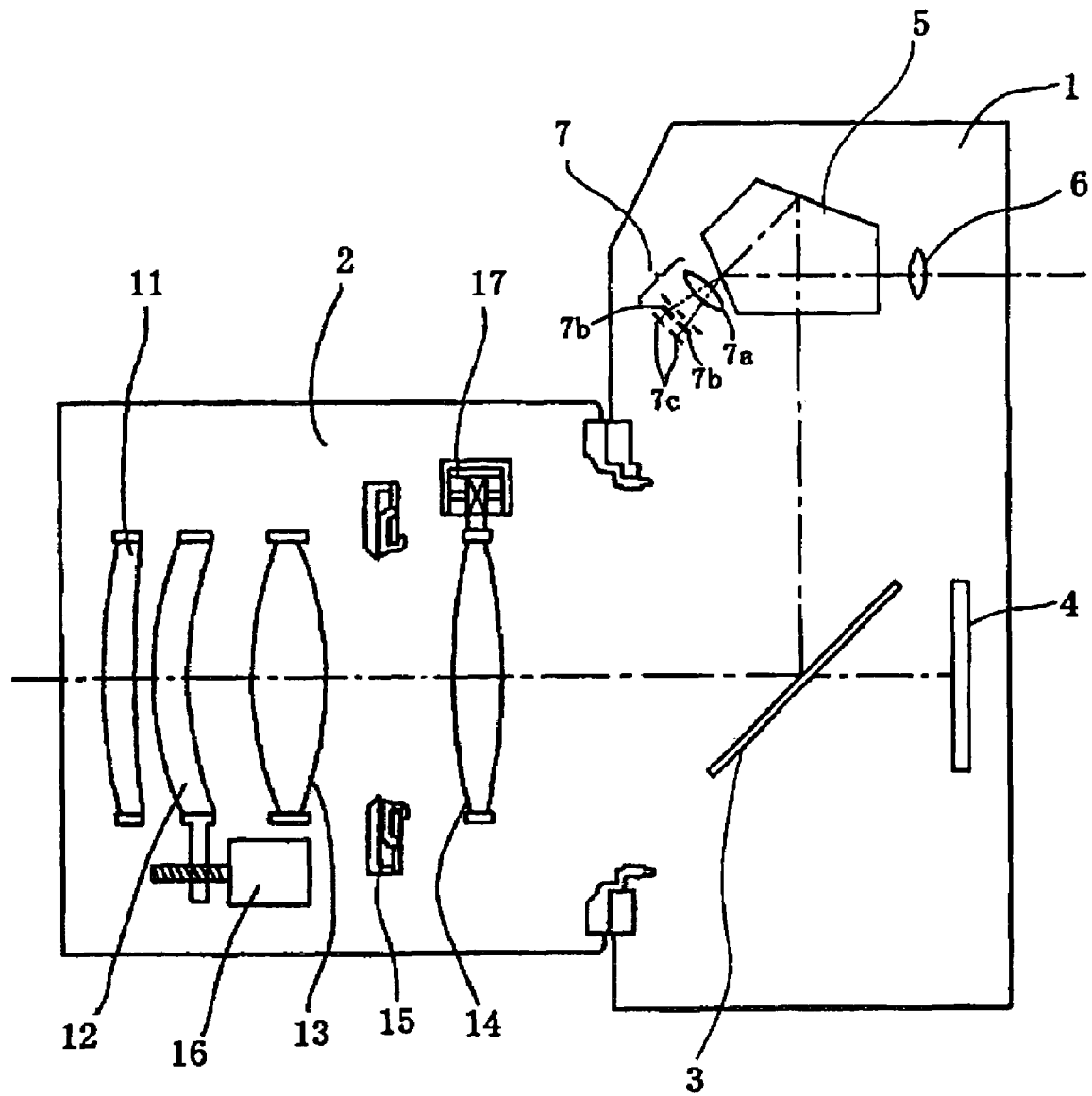
FIG. 1 is a section view showing an image-taking apparatus according to Embodiment 1 of the present invention.

FIG. 1 is a section view showing an image-taking apparatus which is Embodiment 1 of the present invention and on which an interchangeable lens apparatus is mounted. Embodiment 1 will be described in conjunction with a single-lens reflex camera as an example.

Reference numeral 1 shows a camera body, and reference numeral 2 shows the interchangeable lens apparatus which is removably mounted on the camera body 1. Reference numeral 3 shows a mirror which directs part of a light ray passing through the lens apparatus 2 toward a viewfinder optical system and is disposed on an optical axis of the light ray before image-taking operation and is moved out of the optical axis during the image-taking operation. Reference numeral 4 shows an image-pickup device such as a CCD sensor or a CMOS sensor which serves as a semiconductor image-pickup device for photoelectrically converting a subject image formed on the image-pickup device 4.

The viewfinder optical system is comprised of a pentaprism 5 and a viewfinder lens 6. The pentaprism 5 splits part of a light ray incident thereon toward a focus detection unit 7 of a phase difference method. The focus detection unit 7 is comprised of a separator lens 7a which splits a light ray incident thereon into two luminous fluxes, two condenser lenses 7b which refocuses the luminous fluxes, and a line sensor 7c such as a CCD sensor which photoelectrically converts the focused subject images.

In the lens apparatus 2, reference numeral 11 shows a first lens unit, 12 a second lens unit (a focus lens unit) which constitutes a focusing optical system, and 13 a third lens unit (a zoom lens unit) which provides variable magnification. Reference numeral 14 shows a fourth lens unit which constitutes an image shake correction optical system. The amount of light (light for image-taking) passing through the first to fourth lens units is limited by an aperture 15.

The second lens unit 12 is moved on an optical axis by driving force from a focus lens driving motor 16 and stopped at a predetermined in-focus position to provide focus adjustment. The third lens unit 13 is driven in the optical axis direction to perform operation for variable magnification in response to driving force in the optical axis direction transformed from operation of a user by a transmission mechanism, not shown, which transmits the operation. The fourth lens unit 14 is moved in the direction perpendicular to the optical axis by a shake correction driving motor 17 to provide angular shake correction based on the detection result from an angular shake detection sensor realized by a vibration gyro or the like.

Figure 2:
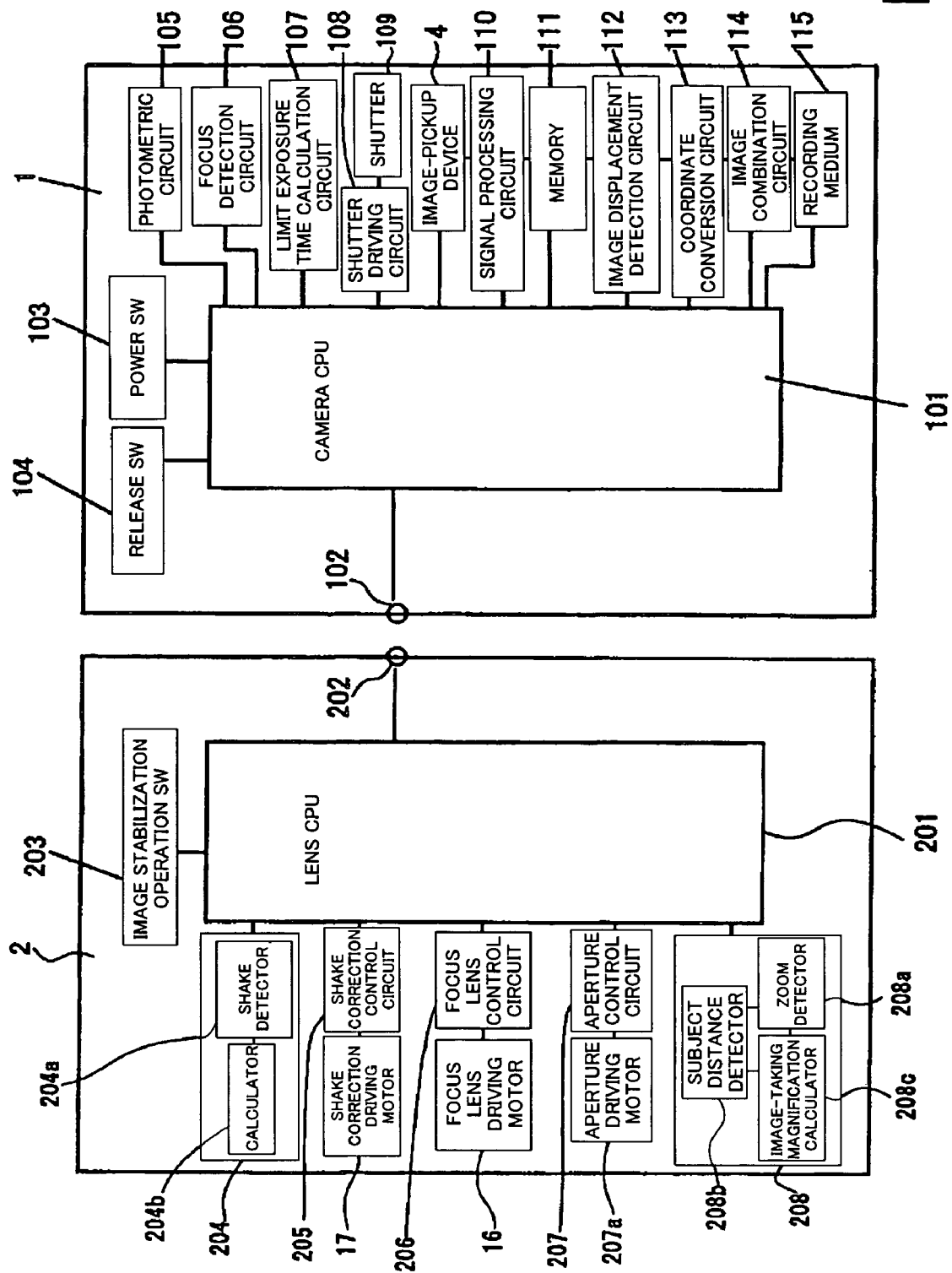
FIG. 2 is a block diagram showing the image-taking apparatus according to Embodiment 1 of the present invention.

FIG. 2 is a block diagram showing the structure of the image-taking apparatus of Embodiment 1. Reference numeral 101 shows a camera CPU serving as a controller realized by a microcomputer. The CPU 101 controls various operations in the camera body 1, later described, and performs transmission and reception of information to and from a lens CPU 201 through a camera contract 102 when the lens apparatus 2 is mounted. The information for transmission includes information about an image-taking magnification, later described, and the like. The camera contact 102 includes a signal transmission contact for transmitting signals and a power contact for supplying power to the lens apparatus 2.

Reference numeral 103 shows a power switch which is provided for starting the camera CPU 101 to supply power to each actuator and sensor in the camera system and allow the system operation. Reference numeral 104 shows a two-step release switch whose signal is sent to the camera CPU 101. Depending on a signal received from the release switch 104, the camera CPU 101 causes a photometric circuit 105 to make photometric measurement to determine the amount of exposure when a first-step switch (SW1) is turned on. The camera CPU 101 also uses a focus detection unit, not shown, to detect the focus state of the lens apparatus 2 for a subject present in a focus detection area and causes a focus detection circuit 106 to calculate a driving amount and a driving direction of the second lens unit 12 necessary for focusing on the subject. When an AF prediction mode is selected, the camera CPU 101 can find the history of variations in distance between an imaging plane and a subject based on AF information from operations performed a plurality of number of times in the past and determine a driving amount of the second lens unit 12 such that focusing is achieved in the middle of exposure.

When a second-step switch (SW2) is turned on, the camera CPU 101 transmits an aperture operation instruction to the lens CPU 201. If an image stabilization operation SW 203 of the lens apparatus 2, later described, is operated to select a shake correction mode prior to exposure, the camera CPU 101 receives image-taking magnification information from the lens CPU 201. A limit exposure time calculation circuit 107 calculates the limit exposure time at which no shift shake occurs and determines whether or not a plurality of exposures are necessary.

Then, the camera CPU 101 outputs an exposure start instruction to a shutter driving circuit 108, moves the mirror 3 out of the optical axis (up operation), opens a shutter 109, and photoelectrically converts a subject image formed on the image-pickup device 4. In addition, the image signal after the photoelectrical conversion is subjected to digital conversion in a signal processing circuit 110 which then outputs the image data.

When a plurality of exposures are necessary, exposure is performed a plurality of number of times with the calculated exposure time until the total of the exposure times reaches the exposure time for achieving appropriate exposure, calculated by the photometric circuit 105. The resulting image signal is stored in a memory 111.

Reference numeral 112 shows an image displacement detection circuit which extracts a feature point in the stored image and determines the position coordinates of the feature point in the taken image. A coordinate conversion circuit 113 performs coordinate conversion of each image such that the feature points of the images provided through the plurality of exposures are placed onto the coordinates of a feature point of a reference image.

An image combination circuit 114 combines the images provided through the plurality of exposures after the coordinate conversion, and the image signal (the image data) is recorded and saved on a recoding medium 115 such as a semiconductor memory including a flash memory, a magnetic disk, and an optical disk.

Reference numeral 201 shows the lens CPU which controls various operations in the lens apparatus 2 and communicates with the camera CPU 101 through a lens contact 202 when the lens apparatus 2 is mounted on the camera body 1. Reference numeral 202 shows the lens contact which includes a signal transmission contact and a power contact, similarly to the camera contact 102 of the camera body 1, and comes in contact with the camera contact 102 to electrically connect the lens apparatus 2 with the camera body 1.

Reference numeral 203 shows the image stabilization operation SW which allows a selection whether or not an image shake correction operation (image stabilization operation) is performed (the image stabilization operation is selected when the SW 203 is turned on), and the information is sent to the camera body 1. Reference numeral 204 shows a shake detection circuit which is comprised of a shake detector 204a which detects the angular velocity of a vertical shake (in a pitch direction) of the image-taking apparatus and a horizontal shake (in a yaw direction) in response to an instruction from the lens CPU 201 and a calculator 204b which outputs a displacement obtained by electrically or mechanically integrating output signals from the detector 204a to the lens CPU 201.

Reference numeral 205 shows a shake correction control circuit which controls the driving of the shake correction driving motor 17 based on the detection result from the angular shake detection sensor realized by a vibration gyro or the like. The shake correction driving motor 17 is formed of a pitch direction driver comprised of a permanent magnet and a coil for driving the fourth lens unit 14 in a pitch direction and a yaw direction driver comprised of a permanent magnet and a coil for driving the fourth lens unit 14 in a yaw direction. A lock mechanism is provided in the lens apparatus 2 for holding the fourth lens unit 14 at a position where its optical axis generally matches the lens optical axis. In response to an instruction signal from the lens CPU 201, the shake correction control circuit 205 causes the lock mechanism to perform lock operation when the image stabilization operation switch 203 is turned off (when shake correction is off) or causes the lock mechanism to perform unlock operation when the image stabilization operation switch 203 is turned on (when the shake correction is performed).

Reference numeral 206 shows a focus lens control circuit which performs driving control in which it drives the focus lens driving motor 16 to drive the second lens unit 12 to an in-focus position in accordance with the movement amount of the second lens unit 12 calculated on the basis of the detection result in the focus detection circuit 106.

Reference numeral 207 shows an aperture control circuit which performs driving control of an aperture driving motor 207a to adjust the opening of the aperture based on an aperture operation signal (an aperture value) transmitted from the camera CPU 101.

Reference numeral 208 shows an image-taking magnification detection circuit which is comprised of a zoom detector 208a which detects the position of the third lens unit 13 serving as a variable magnification lens, a subject distance detector 208b which detects the position of the second lens unit 12, and an image-taking magnification calculator 208c which calculates an image-taking magnification based on position information from the zoom detector 208a and the subject distance detector 208b. The information of the image-taking magnification calculated in the calculator 208c is transmitted to the camera CPU 101 through the lens CPU 201.

Embodiment 1 has both of an optical zoom function for providing variable magnification by driving the third lens unit in the optical axis direction to change the focal length and an electronic zoom function for providing variable magnification by scaling up or down image data provided by photoelectrically converting the subject image formed on the image-pickup device 4 in the camera body 1. The image-taking magnification in this case is determined by multiplying the optical zoom magnification calculated in the image-taking magnification calculator 208c by the electronic zoom magnification calculated in the camera CPU 101.

Next, description will be made of electronic image stabilization processing with the image displacement detection circuit 112, the coordinate conversion circuit 113, and the image combination circuit 114 which serve as an image producing means in Embodiment 1. First, when a user presses the release switch 104 halfway (the SW1 is turned on), preparatory operation for image-taking is started (such as focus adjustment operation and photometric measurement operation). The shutter speed (the exposure time) of the shutter 109 and the aperture opening (the F number) of the aperture 15 are set on the basis of the result of the photometric measurement provided through the photometric measurement operation. In general, a subject is dark under conditions in which the image stabilization system is used in taking images, so that the exposure time as appropriate exposure is set to a large value in seconds even when the aperture 15 is fully open.

Thus, an exposure time in which no shift shake occurs is calculated on the basis of the image-taking magnification information, the exposure time considered as appropriate is divided into a plurality of shorter exposure times, and image-taking is repeated the number of times corresponding to the number of the divided time periods. The division into the shorter exposure times causes underexposure of each image provided through each exposure, but each of the images is less affected by image shake. After the plurality of images are taken, the respective images are combined into one. In this manner, exposure is improved.

When the plurality of images are taken, however, the respective images provided through the plurality of image-taking operations have compositions slightly displaced due to image shake during the successive image-taking operations even when each of the images is not affected by the image shake. If these images are combined without any change, the combined image is blurred in association with the displaced compositions in the respective images.

To address this, in Embodiment 1, a plurality of image signals output from the image-pickup device 4 in the successive image-taking operations are converted into digital signals through A/D conversion and subjected to signal processing in the signal processing circuit 110. The image data from the signal processing circuit 110 is then input to the memory 111 but is not recorded on the recording medium 115 when the image stabilization system is turned on through the operation of the image stabilization operation SW 203.

Figure 3:
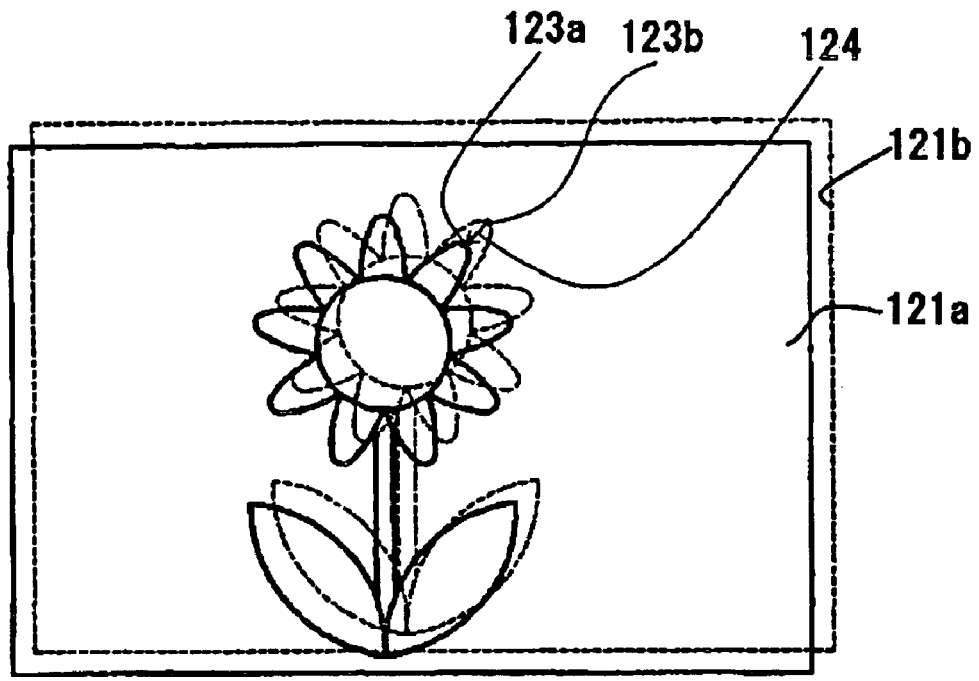
FIG. 3 is an explanatory diagram showing coordinate conversion in an image according to Embodiment 1 of the present invention.

The image displacement detection circuit 112 detects a feature point in each image data stored in the memory 111 and determines the position coordinates of the feature point in the taken image. For example, as shown in FIG. 3, when a closeup image of a flower is taken in a frame 121a, a plurality of image-taking operations for taking a plurality of images result in a displaced composition relative to the frame 121a as shown in a frame 121b due to image shake. In this case, the image displacement detection circuit 112 extracts an edge 123a of a leaf with high luminance of the flower in the frame as a feature point through edge detection, and compares the feature point 123a with a feature point 123b in the frame 121b to detect an image displacement. The coordinate conversion circuit 113b corrects (performs coordinate conversion of) the image displacement (the difference between them).

In FIG. 3, the coordinate conversion is performed by placing the feature point 123b in the frame 121b onto the feature point 123a in the frame 121a as shown by an arrow 124.

Thereafter, the feature point 123a in a first image serving as the reference image is compared with the feature point 123b in a second image to correct the difference (perform the coordinate conversion) similarly to FIG. 3. Specifically, the coordinate conversion circuit 113 converts the coordinates of the second image such that the feature point 123b in the second image is placed onto the feature point 123a in the first image. In each of the second and subsequent images in the second image group, the coordinates of the feature point 123b are determined, and the coordinate conversion circuit 113 converts the coordinates of each image (in the second image group) such that the determined coordinates of feature point 123b are placed onto the coordinates of the feature point 123a defined in the first image.

While the coordinates of the feature point are determined in each image in Embodiment 1, it is possible that correlation calculations are performed between the first image and the first image of the second image group, and the image displacement detection circuit 112 determines the change in the corresponding pixels as a motion vector and provides it as the change in the feature point. In this case, correlation calculations are also performed between the first image and the second image of the second image group to determine the change in the feature points, and the change in the feature points is similarly determined in the subsequent images. It is also possible that, instead of selecting only one feature point, a plurality of points are selected and the average value of the motion vectors of these points or the minimum scalar value is used as the change in the feature point. The average value of the motion vectors or the minimum scalar value is used as the change in the feature point because the least mobile feature point is selected since a feature point selected in the periphery of the frame is likely to move.

In addition, in Embodiment 1, the first image is used as the reference. When two images with displaced compositions are combined, areas 129a and 129b are produced where the two images do not overlap. The image combination circuit 114 performs diffusion interpolation processing only in the area where the two images overlap by excluding the areas 129a and 129b, and provides the original frame size.

For a digital image, exposure compensation can be performed on a single underexposed image by increasing the gain, but a higher gain increases noise to make it impossible to provide a favorable image. However, when a number of images are combined to increase the gain of the combined image as in Embodiment 1, the noise components in the respective images can be averaged to provide an image with a high S/N ratio, resulting in reduced noise and appropriate exposure. In other words, a plurality of images are taken with the image-pickup device 4 set to a high level of sensitivity while noise is permitted, and these noise components are added and averaged to reduce the random noise included in the image.

The respective images after the coordinate conversion in the coordinate conversion circuit 113 are input to the image combination circuit 114 which then combines the images into a single image. The combined image data is subjected to gamma correction processing and compression processing before recording on the recording medium 115.

Figure 5:
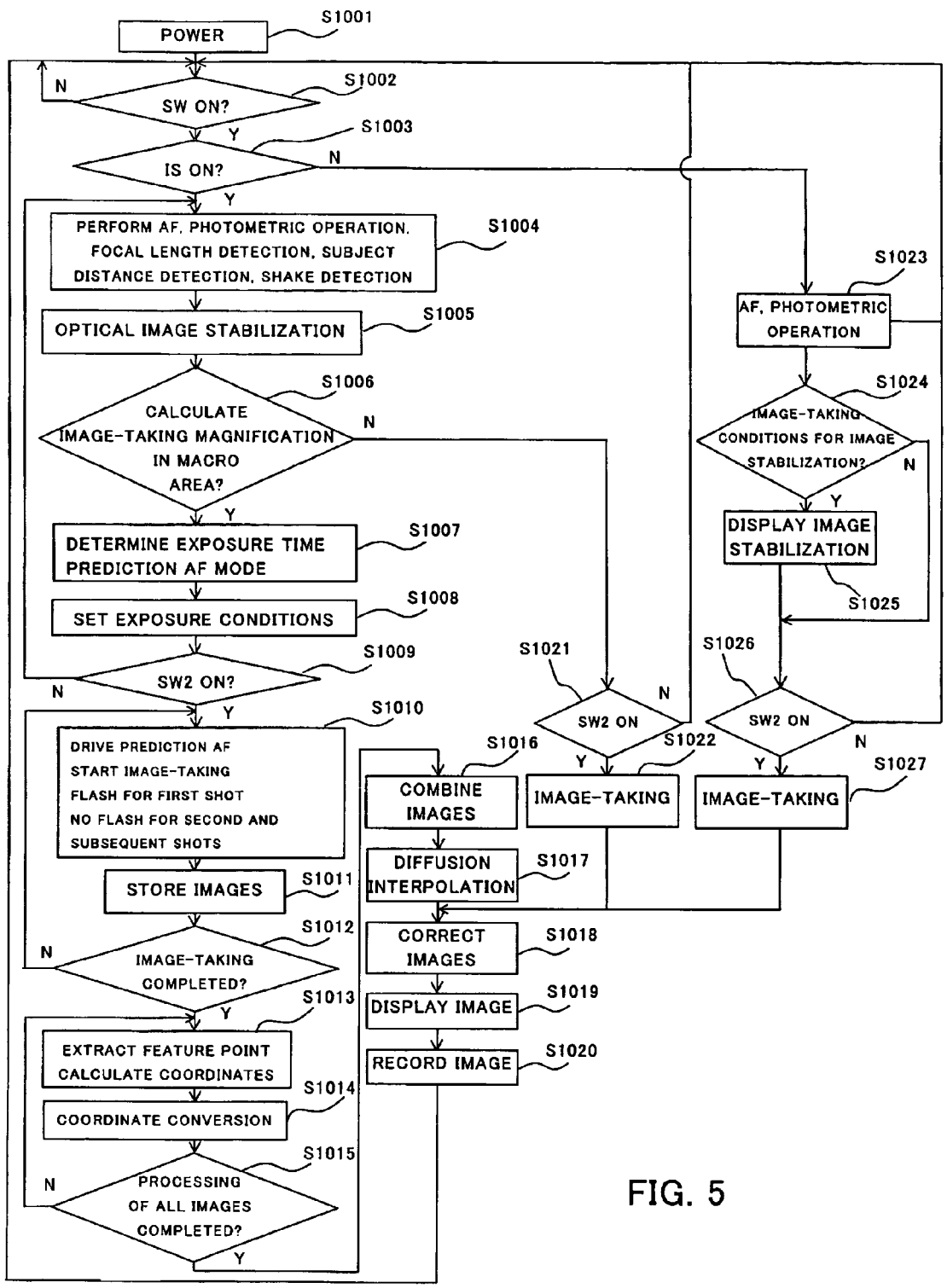
FIG. 5 is a flow chart showing the operations in a camera system according to Embodiment 1 of the present invention.

FIG. 5 is a flow chart showing the principal operations in the camera system serving as the image-taking apparatus of Embodiment 1.

First, the power SW 103 of the camera body 1 is turned on to start power supply to the lens apparatus 2 (or when a new battery is loaded or when the lens apparatus 2 is mounted on the camera body 1, communication is started between the camera body 1 and the lens apparatus 2) (S1001).

Next, the camera CPU 101 determines whether or not the SW1 of the release SW 104 is turned on (S1002). When it is turned on, the lens CPU 102 determines whether or not the image stabilization operation SW 203 is turned on (the image stabilization is selected) (S1003). The flow proceeds to step 1004 if the image stabilization operation is selected, or to step 1023 if it is not selected.

Then, the camera CPU 101 performs photometric measurement and focus detection. The lens CPU 201 performs focus adjustment operation, image shake detection, focal length detection, and focus detection (S1004).

After a predetermined time period elapses, the lens CPU 201 receives a signal for correcting image shake from the shake detection circuit 204 and outputs it to the shake correction control circuit 205 to start image shake correction (S1005). The lens CPU 201 calculates an image-taking magnification from the detected focal length and the subject distance, and determines whether or not the image-taking magnification falls within a macro image stabilization area (the image-taking magnification is high) (S1006).

In the determination at step 1006, when the image-taking magnification is equal to or larger than a predetermined threshold value, it is determined that it falls within the macro image stabilization area and the flow proceeds to processing at and after step 1007 (a first mode). When the image-taking magnification is smaller than the threshold value, the flow proceeds to processing at and after step 1021. Specifically, the arbitrarily specified threshold value is set to an image-taking magnification of 0.1, for example. When the image-taking magnification is 0.1 or larger, it is determined that the optical image stabilization at step 1005 did not achieve sufficient image shake correction, and electronic image stabilization is also performed through image combination processing at and after step 1007.

When it is determined that the image-taking magnification falls within the macro image stabilization area at step 1006, the limit exposure time calculation circuit 107 calculates an exposure time in which shift shake is permitted, and the focus adjustment operation (AF) is changed to a prediction servo mode for following a change in the distance from the imaging plane to the subject at all times (S1007). In addition, the number of image-taking operations to be performed separately is calculated from the light through the image-taking optical system (F number) set on the basis of the photometric value, the appropriate exposure time determined from the sensitivity of the image-pickup device 4, and the shift shake limit exposure time (S1008).

For example, when the sensitivity of the image-pickup device 4 is set to ISO200, the brightness of the subject is measured, and it may be necessary to fully open the aperture (for example, F 0.8) and set the closing timing of the shutter 109 or the exposure time to ⅛ second in order to perform appropriate exposure based on the photometric measurement result.

In the abovementioned conditions, when an image is taken with an image-taking magnification of 0.3 and an exposure time of ⅛ second, image shake may occur due to shift shake.

Thus, the exposure time is set to $\frac{1}{32}$ second and an image-taking operation is divided into to four operations to prevent image shake. On the other hand, when the image-taking magnification is 0.6, the exposure time is set to $\frac{1}{62}$ second and an image-taking operation is divided into eight operations to prevent shift shake.

In this manner, the exposure time in taking the plurality of images is set on the basis of the image-taking magnification, and the number of the taken images is also set on the basis of the image-taking magnification. This is because shift shake is increased in proportion to the image-taking magnification as described above (the influence of shake is larger toward the telephoto side). The exposure time of each image can be changed to reduce the influence of shift shake in each image to substantially the same level regardless of the image-taking magnification.

When a plurality of images of the same subject are taken, the exposure conditions of the respective image-taking operations are set closer to appropriate exposure as much as possible to allow accurate information to be formed into an image by the image-pickup device 4. When a subject is dark, the image-taking lens is stopped down to cause a dark state, and the sensitivity of the image-pickup device 4 is set to a low level, the exposure time of each image-taking operation is set to the longest possible value to provide effective exposure conditions even when a plurality of images are taken. However, an extremely long exposure time causes the influence of image degradation due to image shake to be shown on the image plane, so that the exposure time is set on the basis of the image-taking magnification such that no shift shake occurs, as described above.

In addition, the lack of the exposure time is compensated for by the number of taken images. Specifically, when the image-taking magnification is high, image degradation occurs due to image shake unless the exposure time is further shortened, so that the exposure time is shortened and accordingly the number of taken images is increased to compensate for the exposure. As a result, the exposure time in taking a plurality of images is longer as the subject is darker, the image-taking lens is stopped down, and the sensitivity of the image-pickup device 4 is lower, while the exposure time is shorter as the image-taking magnification is higher.

The number of taken images in the plurality of image-taking operations is higher as the taken subject is darker, the image-taking lens is stopped down, and the sensitivity of the image-pickup device 4 is lower, while the number is smaller as the image-taking magnification is lower.

Subsequently, the flow proceeds to step 1009. The processing from step 1002 to 1008 is repeatedly performed until the SW2 is turned on in response to fully pressing of the release button. When the SW2 is turned on, the flow proceeds to step 1010.

At step 1010, a first image-taking operation is started. The processing from step 1010 to step 1017, later described, is the operation in a combination image-taking mode in which an image-taking operation with a short exposure time is repeated a plurality of number of times and the images provided through the plurality of image-taking operations are combined to achieve appropriate apparent exposure.

The focus adjustment operation involves estimating a change in distance between the imaging plane and the subject based on AF information from the operations performed a plurality of number of times in the past, predicting the in-focus position in the middle of the exposure time of a plurality of exposures, and driving the focus lens before start of exposure to correct defocus. (It is possible that the in-focus position is predicted in the middle of the exposure time of each exposure and the focus lens is driven for each exposure to correct defocus.) The images taken at step 1010 are once stored in the memory 111 at step 1011. The processing at step 1010 and 1011 is repeatedly performed until all the image-taking operations (for taking a plurality of images) are completed (S1012). Then, the flow proceeds to step 1013 when the image-taking operations are completed. The image displacement detection circuit 112 extracts a characteristic pattern (a feature point) from the image and determines the coordinates of the pattern. In addition, the coordinate conversion circuit 113 performs coordinate conversion of each image (S1014). As described above, the first image is not subjected to the coordinate conversion and is used as the first image which is the reference of the coordinate conversion of the second and subsequent images.

When the coordinate conversion processing is finished on all the plurality of taken images (S1015), the flow proceeds to image combination processing. At step 1016, the first image is combined with each image of the second image group (the plurality of images including the second and subsequent images) after the coordinate conversion. The image combination processing is performed by adding and averaging the signals in the corresponding coordinates in the respective images. The random noise in the images is reduced by the adding and averaging. The gain of the image with the reduced noise is increased to provide appropriate exposure.

Figure 4:
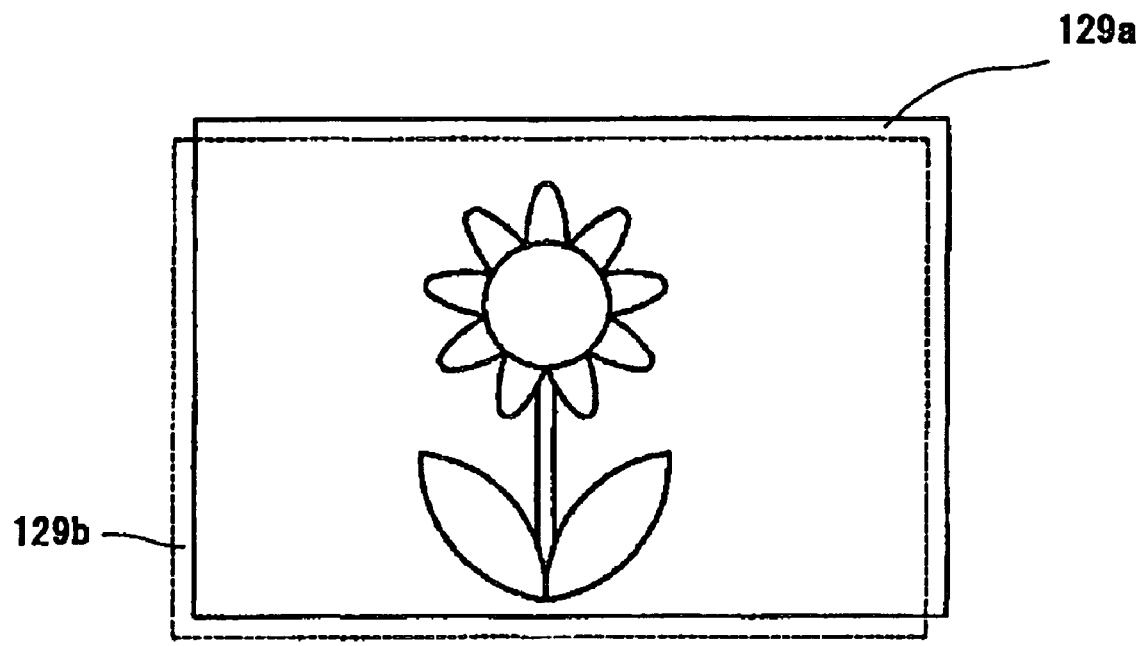
FIG. 4 is an explanatory diagram showing combination of images according to Embodiment 1 of the present invention.

At step 1017, the area (the areas 129a and 129b in FIG. 4) in which the images do not overlap due to the displaced compositions is excluded from the combined image and the image diffusion interpolation processing is performed to provide the original frame size. Gamma correction and compression processing are performed on the combined image (S1018). The resulting combined image is displayed on a liquid crystal display unit, not shown (S1019). Then, at step 1020, the image data provided through the respective processing is recorded on the recording medium 115.

On the other hand, when it is determined that the image-taking magnification does not fall within the macro area at step 1006, the flow proceeds to step 1021 where it is determined whether or not the SW2 is turned on. When it is turned on, a normal image-taking operation is performed (in a normal image-taking mode in which effective exposure conditions are set in a single exposure) (S1022). The flow proceeds to step 1018 where gamma correction, compression processing and the like are performed.

When the image stabilization operation SW 203 is turned off at step 1003, the flow proceeds to step 1023 from step 1003. At step 1023, it is determined whether or not the camera is under image-taking conditions in which image degradation occurs due to image shake if the image stabilization system is not used. The image-taking conditions include the brightness of a subject, F-number, image-taking sensitivity, image-taking magnification, and image-taking focal length. The exposure time is determined on the basis of the brightness of a subject, F-number, and image-taking sensitivity. It is determined whether or not that exposure time is likely to cause image degradation due to image shake at the current image-taking focal length (S1024).

When image degradation is likely to occur due to image shake, the flow proceeds to step 1025 to make a display for recommending the setting of the image stabilization mode on a display, a liquid crystal display unit or the like provided in the viewfinder of the image-taking apparatus. In this manner, even when the image stabilization SW 203 is turned off, the display is made for recommending the use of the image stabilization system (the combination image-taking mode) to a user if the camera is under the image-taking conditions in which image degradation may occur due to image shake, thereby making it possible to prevent image degradation.

Then, the processing from step 1002 to step 1026 is repeatedly performed until the SW2 is turned on. When the SW 2 is turned on, the normal image-taking operation is performed (in the normal image-taking mode in which effective exposure conditions are set in a single exposure) (S1027). After the image is taken, the flow goes through step 1018 to step 1020 and returns to step 1002 for the next image-taking. The series of operations described above is repeated until the power SW 103 is turned off. When it is turned off, the communication between the camera CPU 101 and the lens CPU 201 is finished and the power supply to the lens apparatus 2 is ended.

In this manner, in Embodiment 1, a selection is made between the mode (the second mode) in which only the optical image stabilization is performed and the mode (the first mode) in which the optical image stabilization and the electronic image stabilization are performed.

Specifically, the electronic image stabilization is performed in addition to the optical image stabilization when only the optical image stabilization cannot correct image shake sufficiently, while only the optical image stabilization is performed when only the optical image stabilization can correct image shake.

Therefore, the image shake correction can be appropriately performed to provide an excellent output image. Since the first mode in which the electronic image stabilization is performed or the second mode in which the electronic image stabilization is not performed is selectively performed depending on the image-taking magnification, favorable image-taking operation can be provide without the need for a user to make determination or operation.

When the electronic image stabilization is performed, the image-taking time (exposure time) of each of the plurality of images to be taken is changed depending on the image-taking magnification, so that the effect of shake correction can be achieved sufficiently even with a high image-taking magnification such as in macro imaging.

Even when the electronic image stabilization is performed, the optical image stabilization is also performed to correct angular shake. Thus, the exposure times in the plurality of image-taking operations can be set depending on the image-taking magnification, so that the processing can be performed with the optimal number of image-taking operations (for example, by reducing the number of image-taking operations depending on the image-taking operations). In addition, the trimming area of the image can be increased.

In Embodiment 1 described above, the first mode or the second mode is selected depending on the image-taking magnification. The mode selection can be made depending on the shake magnitude other than the image-taking magnification. In this case, the shake magnitude is determined on the basis of the information (amplitude, frequency or the like) about the image shake and image shake correction output from the shake detector 204*a* of the shake detection circuit 204, and determination is made relative to a threshold as described above, and one of the first and second modes is selected.

The selection of the first or second mode can be made by a user making determination and operation. For example, in the image stabilization operation selection at step 1003 shown in FIG. 5, the user operates to select the first or second mode. In this case, for example, in addition to the display for recommending the setting of the image stabilization mode at steps 1024 and 1025, the degree of image degradation due to image shake can be displayed to smoothly make a selection of the first or second mode.

This application claims a foreign priority benefit based on Japanese Patent Application No. 2004-231574, filed on Aug. 6, 2004, which is hereby incorporated by reference herein in its entirety as if fully set forth herein.

What is claimed is:

1. An image-taking apparatus, comprising:
   an image-pickup device;
   an image generator configured to perform electronic image stabilization processing based on a plurality of images sequentially taken with the image-pickup device to generate an output image in a first mode, and generates an output image without performing the electronic image stabilization processing on an image taken with the image-pickup device in a second mode; and
   a controller configured to perform optical image stabilization processing through driving of an optical system and select the first mode when an image-taking magnification is higher than a predetermined value, and to perform the optical image stabilization processing and select the second mode when the image-taking magnification is lower than the predetermined value.

2. The image-taking apparatus according to claim 1, wherein the controller sets an exposure time for image taking shorter as the image-taking magnification becomes higher.

3. A method of taking an image, comprising:
   a first step of performing electronic image stabilization processing based on a plurality of images sequentially taken with an image-pickup device to generate an output image;
   a second step of generating an output image without performing the electronic image stabilization processing on an image taken with the image-pickup device;
   a step of performing optical image stabilization processing through driving of an optical system and selecting the first step when an image-taking magnification is higher than a predetermined value; and
   a step of performing the optical image stabilization processing and selecting the second step when the image-taking magnification is lower than the predetermined value.

4. The image-taking apparatus according to claim 1, wherein the predetermined value is 0.1.

\* \* \* \* \*